United States Patent
Kato

(10) Patent No.: US 9,584,780 B2
(45) Date of Patent: Feb. 28, 2017

(54) PROJECTOR AND CONTROLLING METHOD OF THE SAME

(71) Applicant: Atsushi Kato, Tokyo (JP)

(72) Inventor: Atsushi Kato, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 14/655,695

(22) PCT Filed: Dec. 27, 2012

(86) PCT No.: PCT/JP2012/083936
§ 371 (c)(1),
(2) Date: Jun. 25, 2015

(87) PCT Pub. No.: WO2014/102976
PCT Pub. Date: Jul. 3, 2014

(65) Prior Publication Data
US 2015/0334384 A1    Nov. 19, 2015

(51) Int. Cl.
*G03B 35/26*     (2006.01)
*H04N 13/04*    (2006.01)
(Continued)

(52) U.S. Cl.
CPC ....... *H04N 9/3164* (2013.01); *G02B 26/0883* (2013.01); *G02B 27/1026* (2013.01);
(Continued)

(58) Field of Classification Search
CPC ........ G03B 35/26; G03B 35/18; G03B 35/22; H04N 13/04; H04N 13/0429;
(Continued)

(56) References Cited

U.S. PATENT DOCUMENTS 6,827,450 B1 *   12/2004   McGettigan ........... G02B 5/201
                                                   348/E9.027
2005/0046806 A1 *  3/2005   Chang ...................... G02B 5/04
                                                   353/81

FOREIGN PATENT DOCUMENTS

JP    S 63-18894 A    1/1988
JP    2001-91894 A    4/2001
(Continued)

OTHER PUBLICATIONS

International Search Report (ISR) (PCT Form PCT/ISA/210), in PCT/JP2012/083936, dated Mar. 12, 2013.
(Continued)

*Primary Examiner* — William C Dowling
*Assistant Examiner* — Ryan Howard
(74) *Attorney, Agent, or Firm* — McGinn IP Law Group, PLLC

(57) ABSTRACT

The projector comprises: at least one light source; a light separation unit separating light emitted from the light source into a first and second lights in different wavelength bands; a TIR prism through which the first and second lights pass; an optical modulating element irradiated with and modulating the first and second lights to emit the modulated first and second lights toward the TIR prism; a projection lens expanding and projecting the light which is modulated by the optical modulating element and passes the TIR prism; a rotating prism which is rotatably arranged in the light path between the light separation unit and the TIR prism and emits, from different positions in accordance with rotation, the first and second lights emitted from the light separation unit; and a control unit which, when the image signals representing a first and second images are supplied, causes the optical modulating element to perform modulation according to the image signal of the first image with regard to the area irradiated by the first light and to perform
(Continued)

modulation according to the image signal of the second image with regard to the area irradiated by the second light.

17 Claims, 9 Drawing Sheets

(51) Int. Cl.
*H04N 9/31* (2006.01)
*G03B 21/20* (2006.01)
*G03B 33/12* (2006.01)
*G03B 35/16* (2006.01)
*G02B 26/08* (2006.01)
*G02B 27/10* (2006.01)
*G02B 27/22* (2006.01)
*G02B 27/26* (2006.01)
*G02B 27/09* (2006.01)

(52) U.S. Cl.
CPC ......... *G02B 27/2264* (2013.01); *G02B 27/26* (2013.01); *G03B 21/2066* (2013.01); *G03B 33/12* (2013.01); *G03B 35/16* (2013.01); *G03B 35/26* (2013.01); *H04N 9/312* (2013.01); *H04N 9/3111* (2013.01); *H04N 9/3152* (2013.01); *H04N 9/3182* (2013.01); *H04N 13/0422* (2013.01); *H04N 13/0427* (2013.01); *H04N 13/0431* (2013.01); *H04N 13/0443* (2013.01); *H04N 13/0459* (2013.01); *G02B 27/0927* (2013.01); *G02B 27/0994* (2013.01)

(58) Field of Classification Search
CPC ........... H04N 13/0436; H04N 13/0431; H04N 13/0459; H04N 13/0427; H04N 9/3164; H04N 9/3111; G02B 27/26; G02B 27/1026; G02B 27/2242; G02B 26/0883
USPC ........... 353/7, 8, 81; 359/211.1, 211.2, 211.5
See application file for complete search history.

(56) References Cited

FOREIGN PATENT DOCUMENTS

| | | |
|---|---|---|
| JP | 2002-328332 A | 11/2002 |
| JP | 2004-205919 A | 7/2004 |
| JP | 2006-208955 A | 8/2006 |
| JP | 2007-328122 A | 12/2007 |
| JP | 2008-65250 A | 3/2008 |
| JP | 2009-229645 A | 10/2009 |
| JP | 2010-286635 A | 12/2010 |
| JP | 2011-510333 A | 3/2011 |
| JP | 2012-181417 A | 9/2012 |
| JP | 2015-502558 A | 1/2015 |
| WO | WO 2009/150743 A1 | 12/2009 |

OTHER PUBLICATIONS

Japanese Office Action dated Mar. 29, 2016 with a partial English translation.

* cited by examiner

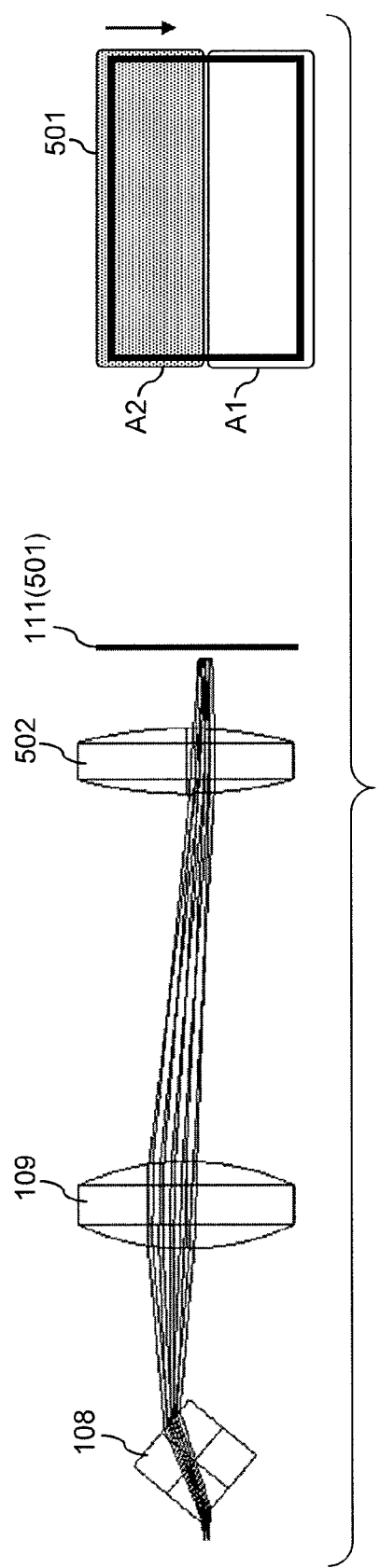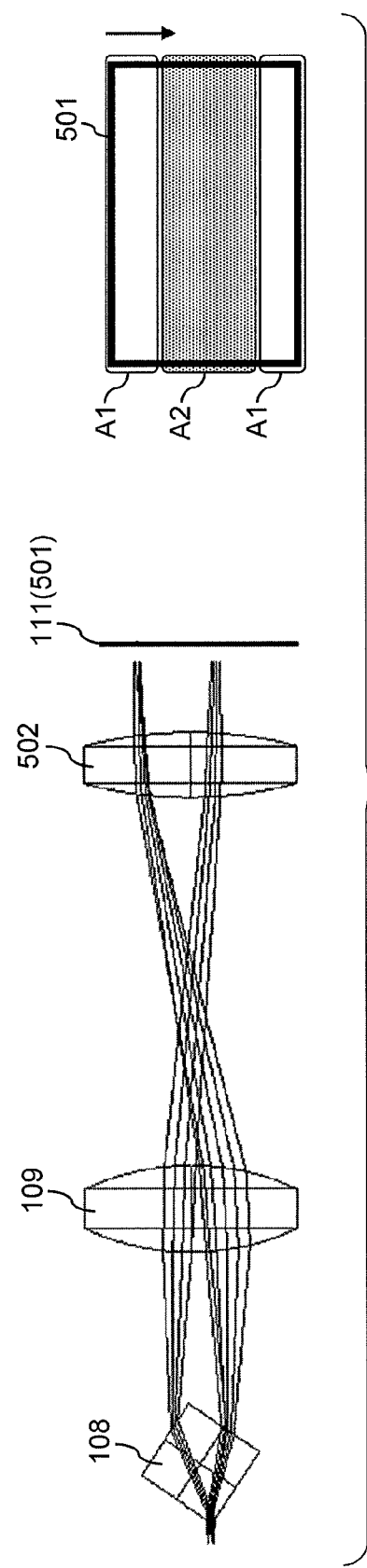

PROJECTOR AND CONTROLLING METHOD OF THE SAME

TECHNICAL FIELD

The present invention relates to a projector capable of displaying stereoscopic images and a method of controlling the projector.

BACKGROUND ART

A technology using a projector, able to display on large screens, for stereoscopically displaying images is being developed and commercialized. In the stereoscopic image display using a projector, a disparity-based method is generally adopted in which Left-eye images and right-eye images are alternately displayed on a screen via the projector. In this method, a viewer is allowed to observe the left-eye image with his or her left eye and observe the right-eye image with the right eye, thereby enabling the viewer to stereoscopically perceiving images using the disparity.

In the disparity-based method, it is necessary to allow the viewer observe respective images corresponding to the left and right eyes. A polarization method is one of the methods of allowing the viewer to observe the respective images corresponding to both eyes.

In the polarization method, the left-eye image and the right-eye image are projected from a projector onto a screen in different polarization states. The viewer is allowed to look at the projected images through polarization glasses with polarization selectivity, whereby the viewer observes the respective images corresponding to the left and right eyes to perceive the images stereoscopically.

As the method for projecting the left-eye image and the right-eye image in different polarization states, a method is proposed in which two sets of projectors are prepared, one projector projects the left-eye image and the other projector projects the right-eye image. In this method, in order to eliminate the inconvenience of preparing two projectors with different polarization states of projected light, it is practiced to use two projectors in an equivalent polarization state, in which the polarization state of projected light from one projector is switched by a polarization element consisting of a reflective mirror. Through this method, it is possible to project a left-eye image and a right-eye image in different polarization states by one projector and the other projector.

In the above-described method of using two projectors, the brightness and color should be matched between the projectors, the position of projection needs to be adjusted and it is time consuming. Moreover, the system cannot be made smaller as two projectors are used, and is inconvenient to use.

Then, PL1 (JP 2004-2059192A) and PL2 (JP H63-018894A) disclose techniques in which one projector projects both the left-eye image and the right-eye image in different polarization states.

In the technique disclosed in PL1, the light emitted from a light source is split into two orthogonal linearly-polarized lights by reflective polarizing plate. Also, in the technique disclosed in PL1, two digital micro-mirror devices (DMDs) are provided on a projector as light modulating elements. The two orthogonal linearly-polarized lights separated by the reflective polarizing plate are each modulated by different DMD. The modulated lights of respective DMDs are combined by a polarized beam splitter, and projected by a projection lens. According to the technique described in PL1, one of the two DMDs performs modulation based on the image signal of the left-eye image, and the other DMD performs modulation based on the image signal of the right-eye image, thereby enabling the left-eye image and the right-eye image to be projected simultaneously in different polarization states from a single projector.

In the technique disclosed in PL2, a liquid-crystal light bulb is alternately driven based on the image signal of the left-eye image and the image signal of the right-eye image. The light emitted from the liquid-crystal light bulb is projected onto a screen through polarization switch element, which consists of a liquid-crystal panel capable of switching its polarization state. In the technique disclosed in PL2, both the left-eye and right eye-images in different polarization states can be projected alternatively in a time division manner from one projector, by switching the polarization state of polarization switch element between driving the liquid-crystal light bulb based on the image signal for left-eye images and driving the liquid-crystal light bulb based on the image signal for right-eye images.

CITATION LIST

Patent Literatures

[PL1] JP 2004-2059192A
[PL 2] JP H63-018894A

SUMMARY OF THE INVENTION

Problems to be Solved by the Invention

In the technique disclosed in PL1, cost is bound to increase since two DMDs are required. Also, the technique disclosed in PL1 requires a reflective polarizing plate for separating a light emitted from a light source into linearly-polarized lights with different polarization states, as well as a polarized beam splitter for combining two linearly-polarized lights that pass through two different light paths, thereby incurring a increase in cost, complication of the optical system and enlargement of the projector. In particular, placing the polarized beam splitter between the DMD, which is a modulating element, and a projection lens, lengthens a back focus of the projection lens (i.e., the distance between the projection lens and DMD) and thus, incurs enlargement of the projection lens and optical system and results in a cost increase.

In the technique disclosed in PL2, since the polarization switch element is placed between the liquid-crystal light bulb, which is a modulating element, and the projection lens, a back focus of the projection lens (i.e., the distance between the projection lens and DMD) is lengthened. A larger projection lens and optical system and an increase in the cost is incurred.

The object of the present invention is to provide a projector with a simple composition that can display stereoscopic images and a method of controlling the projector.

Means to Solve the Problems

In order to achieve the above object, the projector according to the present invention comprises:
 at least one light source;
 a light separation unit which separates light emitted from the light source into a first light and a second light in different wavelength bands;
 a TIR prism through which the first and second light pass;

an optical modulating element which is irradiated with and modulates the first light and the second light emitted from the TIR prism and then emits the modulated first light and the modulated second light toward the TIR prism;

a projection lens expanding and projecting light which is modulated by the optical modulating element and passes through the TIR prism;

a rotating prism which is rotatably arranged in a light path between the light separation unit and the TIR prism and emits, from different positions in accordance with rotation, the first light and the second light emitted from the light separation unit; and a control unit causing, when image signals representing a first image and a second image are supplied, the optical modulating element to perform modulation according to the image signal of the first image with regard to an area upon which the first light is irradiated and to perform modulation according to the image signal of the second image with regard to an area upon which the second light is irradiated.

In order to achieve the above object, the control method of a projector according to the present invention comprises:

inputting an image signal of a first image and an image signal of a second image into the projector;

causing a light source to emit light to be incident on a light separation unit thereby separating the light into a first light and a second light in different wavelength bands by the light separation unit;

introducing the first light and the second light into a rotating prism rotatably arranged in a light path between the light reparation unit and an optical modulating element;

causing the rotating prism to emit the first light and the second light from different positions in accordance with rotation thereof to irradiate the first light and the second light, which are emitted from the rotating prism, to the optical modulating element; and causing the optical modulating element to perform modulation according to the image signal of the first image with regard to an area upon which the first light is irradiated and to perform modulation according to the image signal of the second image with regard to an area upon which the second light is irradiated.

BRIEF DESCRIPTION OF THE DRAWINGS

FIG. 5C is a view explaining operation of rotation of the rotating prism shown in FIG. 1;

FIG. 5D is a view explaining operation of rotation of the rotating prism shown in FIG. 1;

MODE FOR CARRYING OUT THE INVENTION

The embodiments of the present invention will be described below with reference to the drawings.

First Embodiment:

The projector according to the present invention displays the left-eye image and the right-eye image on a screen in response to input of stereoscopic image signals for the left-eye image and the right-eye which have disparity. A viewer is allowed to observe the image displayed on a screen through glasses in which filters having different wavelength bands for transmitting light are provided for the left eye and the right eye, respectively, whereby the viewer can perceive the image stereoscopically.

Figure 1:
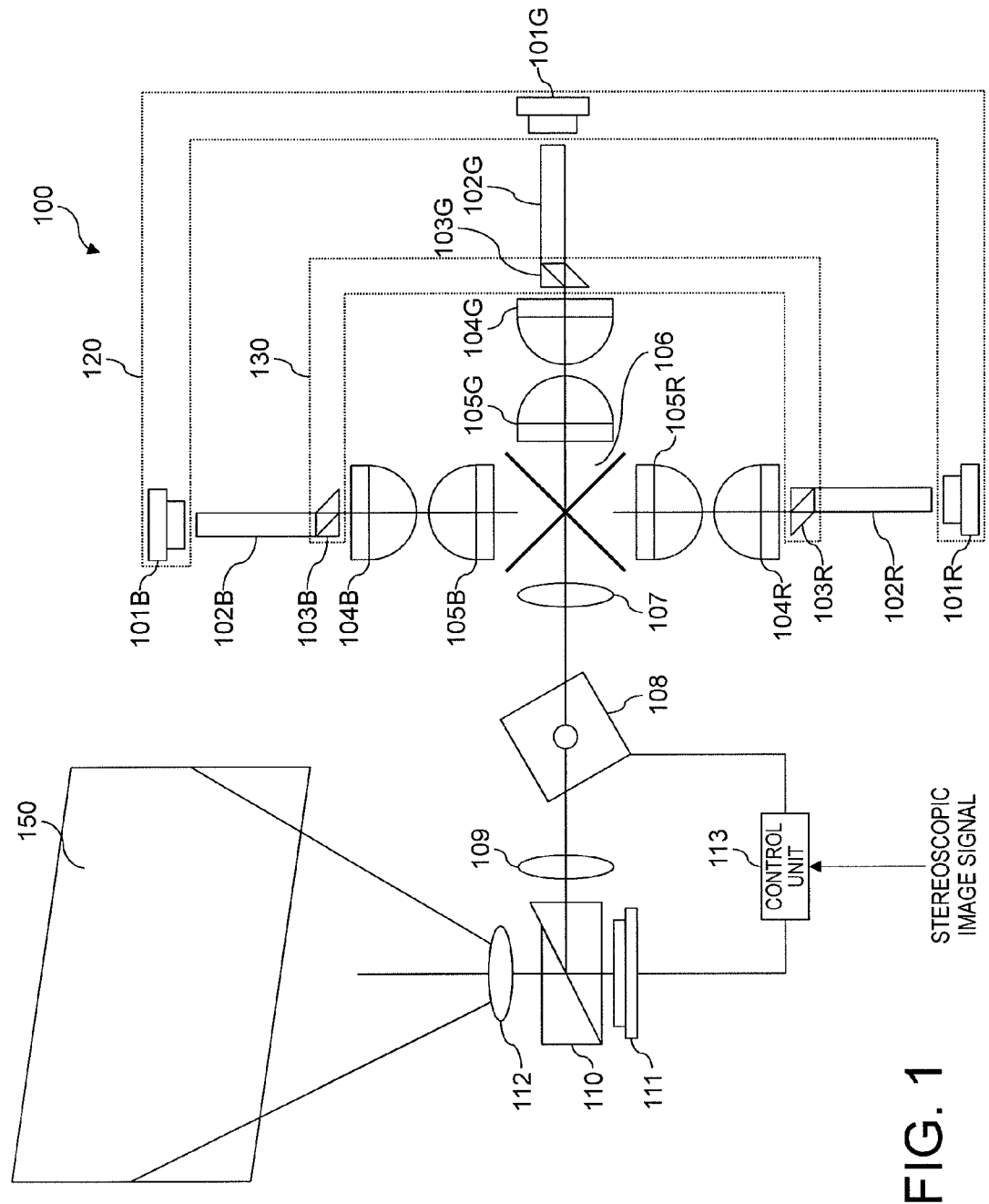
FIG. 1 is a schematic constitution diagram of a projector according to the first embodiment of the present invention.

FIG. 1 is a schematic constitution diagram of a projector according to the first embodiment of the present invention.

Projector 100 shown in FIG. 1 includes: R (red)-colored separate light source 101R, G (green)-colored separate light source 101G, B (blue)-colored separate light source 101G; rod integrators 102R, 102G, 102B; color splitting prisms 103R, 103G, 103B; illuminating lenses 104R, 104G, 104B, 105R, 105G, 105B, 107, 109; color-composing dichroic mirror 106; rotating prism 108; TIR (total internal reflection) prism 110; DMD 111; projection lens 112; and control unit 113.

Rod integrator 102R, color splitting prism 103R and illuminating lenses 104R, 105R are arranged with regards to R-colored separate light source 101R, thereby forming an optical system for red light. Rod integrator 102G, color splitting prism 103G and illuminating lenses 104G, 105G are arranged with regards to G-colored separate light source 101G, thereby forming an optical system for green light. Rod integrator 102B, color splitting prism 103B and illumination lenses 104B, 105B are arranged with regards to B-colored separate light source 101B, thereby forming an optical system for blue light.

Hereinafter, when R-colored separate light source 101R, G-colored separate light source 101G and B-colored separate light source 101G are not distinguished from each other, they may be referred to as separate light sources 101; rod integrators 102R, 102G, 102B may be referred to as rod integrators 102 when they are not distinguished from each other; color splitting prisms 103R, 103G, 103B may be referred to as color splitting prisms 103 when they are not distinguished from each other; illumination lenses 104R, 104G, 104B may be referred to as illumination lenses 104 when they are not distinguished from each other; and illumination lenses 105R, 105G, 105B may be referred to as illumination lenses 105 when they are not distinguished from each other.

Separate light source 101 is composed of, for example, LED (light emitting diode) and semiconductor laser. Recently, a technology of irradiating laser light such as blue laser light on fluorescent substance as excitation light and using the fluorescence emitted from the fluorescent substance excited by the excitation light is put to practical use. Separate light source 101 may be constituted of using such technology. An LED or semiconductor laser generally has a longer life than a discharge lamp, and thus, it is suitable to be used on light source unit 101 of projector 100.

R-colored separate light source 101R emits red light. The red light emitted from R-colored separate light source 101R enters rod integrator 102R.

G-colored separate light source 101G emits green light. The green light emitted from G-colored separate light source 101G enters rod integrator 102G.

B-colored separate light source 101B emits blue light. The blue light emitted from R-colored separate light source 101R enters rod integrator 102B.

R-colored separate light source 101R, G-colored separate light source 101G and B-colored separate light source 101G constitute light source unit 120.

Rod integrator 102 is an optical part generally with a prismatic shape, composed of materials such as optical glass and optical resin. Rod integrator 102 equalizes the irradiance distribution of light entered on an incident plane, converts the incident light into a light having a cross section of a rectangular-shape. and emits the converted light from an exit plane. It should be noted that the incident plane and the exit plane of rod integrator 102 are usually the same in form, but may also be different from each other in form. The idea of 'equalizing the irradiance distribution of light entered on an incident plane' is not restricted to completely equalizing the irradiance distribution, but includes making the irradiance distribution more smooth, reducing difference between the top and the bottom of the irradiance distribution, and so on.

Rod integrator 102R equalizes the irradiance distribution of incident red light from R-colored separate light source 101R, converts the incident red light into a light with a rectangular-shaped cross section, and emits the converted light from the exit plane.

Rod integrator 102G equalizes the irradiance distribution of incident green light from G-colored separate light source 101G, converts the incident green light into a light with a rectangular-shaped cross section, and emits the converted light from the exit plane.

Rod integrator 102B equalizes the irradiance distribution of incident blue light from B-colored separate light source 101B, converts the incident blue light into a light with a rectangular-shaped cross section, and emits the converted light from the exit plane.

Color splitting prism 103 is joined to the exit plane of corresponding rod integrator 102. Color splitting prism 103 separates the light emitted from the exit plane into two lights having different wavelength bands and emits the lights to corresponding illuminating lens 104. More specifically, color splitting prism 103 splits the incident light from rod integrator 102 into light of shorter-wavelength side and light of longer-wavelength side with regard to the wavelength band of the incident light and emits the split lights to corresponding illuminating lens 104.

Figure 2A:
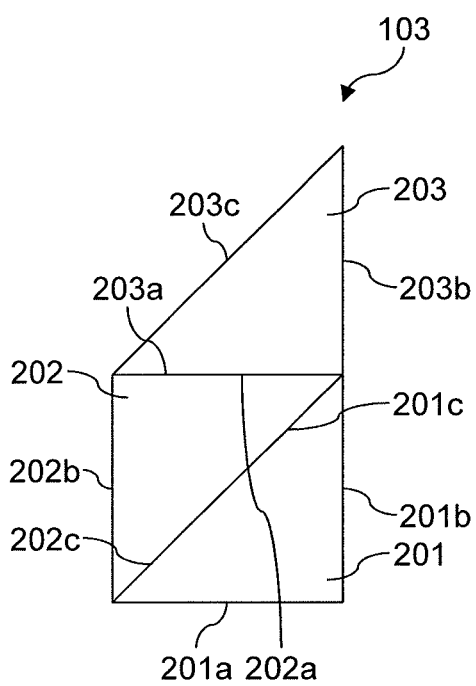
FIG. 2A is a top view illustrating an example of configuration of the color splitting prism shown in FIG. 1.

FIG. 2A is a top view illustrating configuration of color splitting prism 103.

As shown in FIG. 2A, color splitting prism 103 is composed of three right-angled prisms 201 to 203.

Hereinafter, with regard to right-angled prism 201, the face corresponding to the hypotenuse of the right-angled triangle shown in FIG. 2A is referred to as face 201c, and the faces corresponding to the remaining two sides of the right-angled triangle are referred to as faces 201a, 201b, respectively. With regard to right-angled prism 202, the face corresponding to the hypotenuse of the right triangle shown in FIG. 2A is referred to as face 202c, and the faces corresponding to the remaining two sides of the right-angled triangle are referred to as faces 202a, 202b, respectively. With regard to right-angled prism 203, the face corresponding to the hypotenuse of the right-angled triangle shown in FIG. 2A is referred to as face 203c, and the faces corresponding to the remaining two sides of the right-angled triangle are referred to as faces 203a, 203b, respectively.

Right-angled prism 201 and right-angled prism 202 are jointed with each other by means of face 201c and face 202c, thereby constituted in a cube shape as a whole.

On face 202b of right-angled prism 202, the exit plane of rod integrator 102 (not shown in FIG. 2A) is jointed thereto, and the light emitted from rod integrator 102 is incident on face 202b of right-angled prism 202.

Although the present embodiment is described by using an example in which rod integrator 102 is jointed with face 202b of right-angled prism 202, which is integrated with corresponding color splitting prism 103, color splitting prism 103 and corresponding rod integrator 102 may be placed to maintain an air gap therebetween.

Right-angled prism 202 and right-angled prism 203 are jointed with each other by means of face 202a and face 203a.

Here, on one of face 201c of right-angled prism 201 and face 202c of right-angled prism 202, formed is a wavelength selective film (dichroic mirror film) which has the property of reflecting light of the shorter-wavelength side and transmitting light of the longer-wavelength side, from the wavelength band of the light emitted from separate light source 101 corresponding to color splitting prism 103. The wavelength selective film is designed so that amount of light incident on face 202b is almost equally divided into the transmitting light and the reflecting light. Meanwhile, the described wavelength selective film is frequently used in a dichroic mirror and a dichroic prism, which are optical parts of a projector.

Of the light incident on face 202b of right-angled prism 202, the longer-wavelength light passes through the wavelength selective film and is emitted from face 201b of right-angled prism 201. On the other hand, the shorter-wavelength light from the light incident on face 202b of right-angled prism 202 is reflected by the wavelength selective film toward right-angled prism 203. This light is then reflected by face 203c of right-angled prism 203, and is emitted from face 203a.

Thus, due to color splitting prism 103, the light emitted from corresponding separate light source 101 is split into two lights with different wavelength bands (i.e., shorter-wavelength light and longer-wavelength light) and is emitted.

Figure 2B:
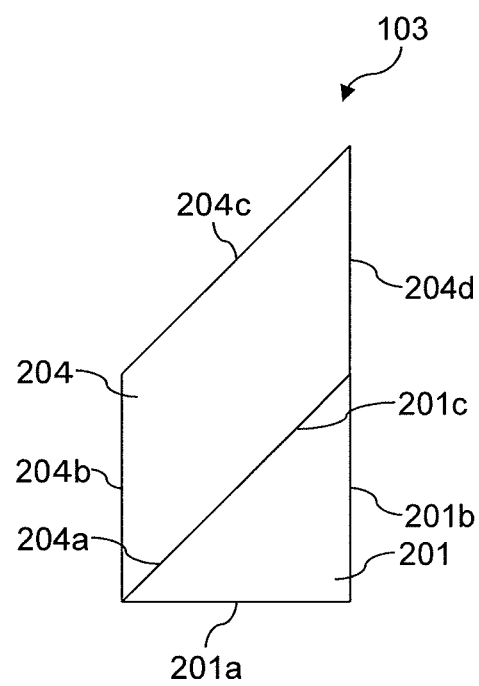
FIG. 2B is a top view illustrating another example of configuration of the color splitting prism shown in FIG. 1.

The constitution of color splitting prism 103 is not restricted to the one described in FIG. 2A. For example, as illustrated in FIG. 2B, color splitting prism 103 may consist of right-angled prism 201 and prism 204 having a parallelogram shape. With regard to FIG. 2B, the constitution elements similar to those shown in FIG. 2A will be given the same reference signs, and descriptions thereof will be omitted. Hereinafter, with regard to prism 204, faces corresponding to the four sides shown in FIG. 2B will be referred to as faces 204a to 204d.

Right-angled prism 201 and prism 204 are jointed with each other by means of face 201c and face 204a.

Face 204b of prism 204 is jointed with the exit plane of rod integrator 102 (not shown in FIG. 2B) and the light emitted from rod integrator 102 is incident on face 204b of prism 204. Color splitting prism 103 in FIG. 2B may be placed while maintaining an air gap with corresponding rod integrator 102.

Here, on one of face 201c of right-angled prism 201 and face 204a of prism 204, formed is a wavelength selective film which has the property of reflecting light of the shorter-wavelength side and transmitting light of the longer-wavelength side, from the wavelength band of the light emitted from separate light source 101 corresponding to color splitting prism 103.

Of the light incident on face 204b of prism 204, the longer-wavelength light passes through the wavelength selective film, and is emitted from face 201b of right-angled prism 201. On the other hand, of the light incident on face 204b of prism 204, the shorter-wavelength light is reflected by the wavelength selective film toward face 204c of prism 204. This light is reflected on face 203c of right-angled prism 204, and is emitted from face 203d.

Thus, also in color splitting prism 103 shown in FIG. 2B, the light emitted from corresponding separate light source 101 is separated into two lights with different wavelength bands (i.e., shorter-wavelength light and longer-wavelength light) and is emitted.

Figure 3:
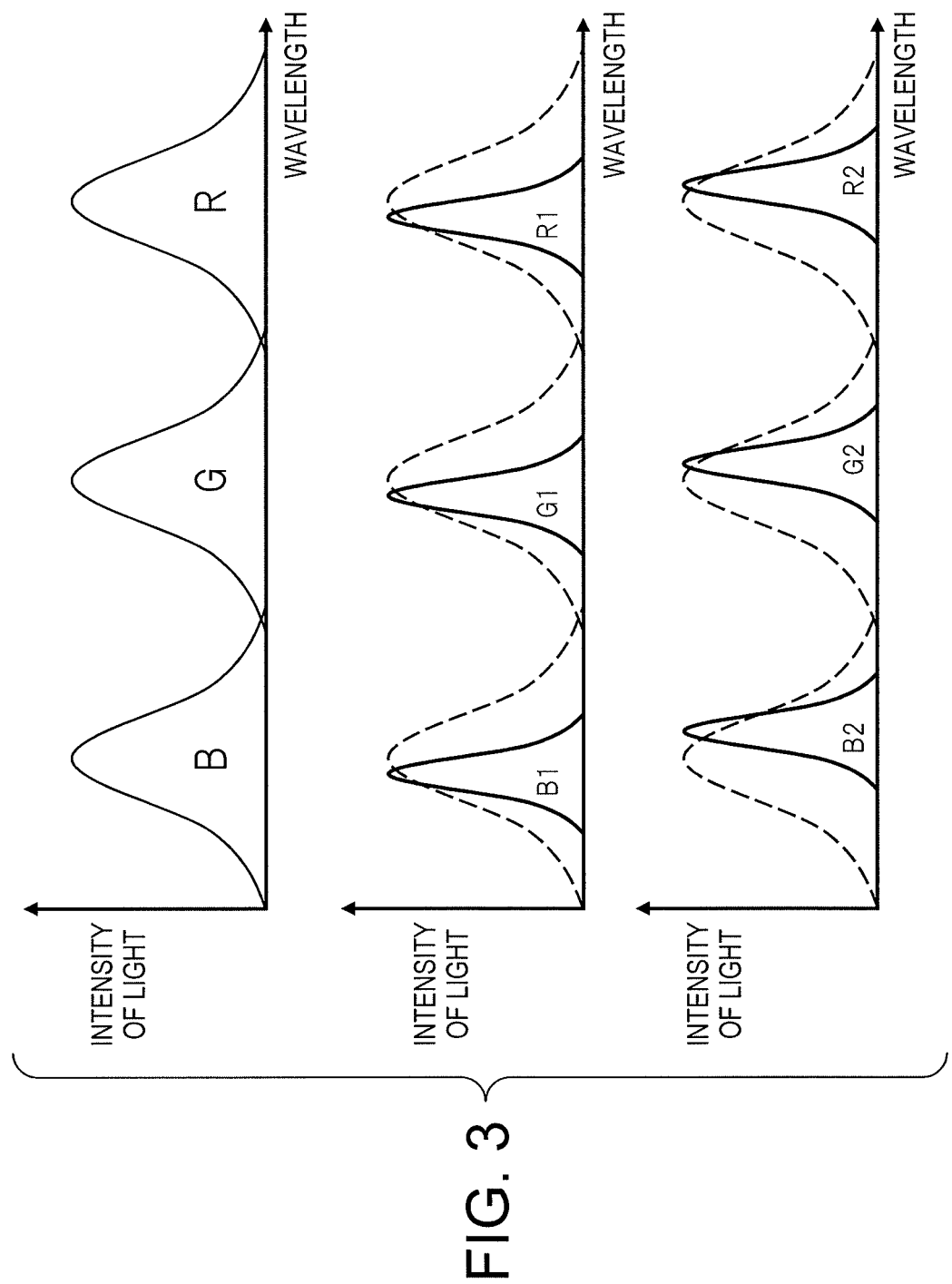
FIG. 3 is a view explaining separation of light by the color splitting prism shown in FIG. 1.
Figure 4A:
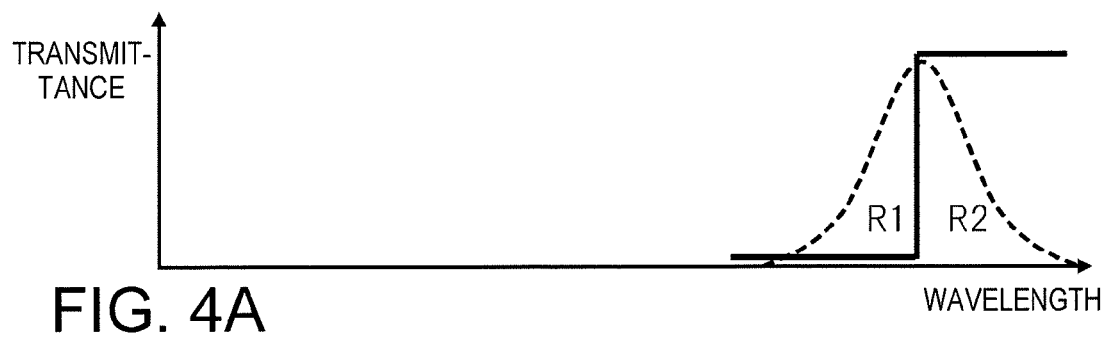
FIG. 4A is a graph showing characteristics of a wavelength selective film formed on light separation prism 103R shown in FIG. 1.

Referring to FIG. 1 again, color splitting prism 103R separates the red light emitted from rod integrator 102R into the shorter-wavelength light and the longer-wavelength light, of the wavelength band of the red light. Here, as shown in FIG. 3, if wavelength band of the light emitted from rod integrator 102R is called R, color splitting prism 103R splits the light into the shorter-wavelength light (wavelength band R1) and the longer-wavelength light (wavelength band R2), from wavelength band R. That is, the shorter-wavelength light (wavelength band R1) and the longer-wavelength light (wavelength band R2) (hereinafter referred to as red light R2) of wavelength band R are definitely red in color, and the two lights are so called 'of the same color.' In order to separate the light in this manner, it is desirable to design the wavelength selective film formed on color splitting prism 103R to have the property of reflecting light of wavelength band R1 and transmitting light of wavelength band R2, as shown in FIG. 4A.

Figure 4B:
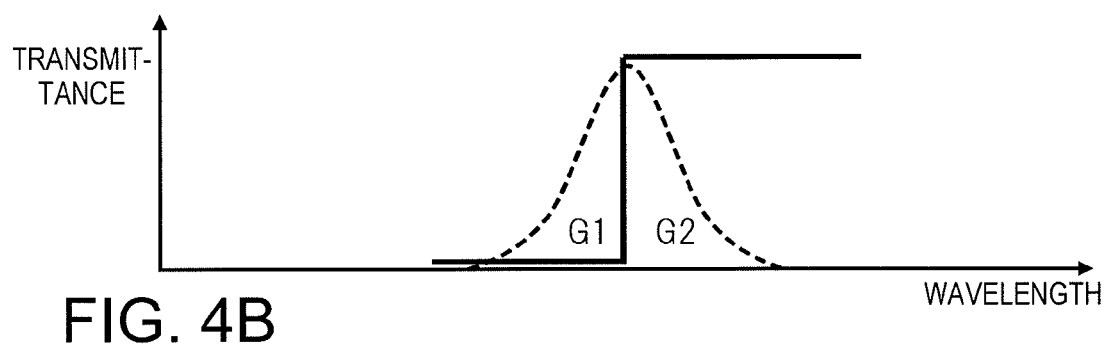
FIG. 4B is a graph showing characteristics of a wavelength selective film formed on light separation prism 103G shown in FIG. 1.

Color splitting prism 103G separates the green light emitted from rod integrator 102G into light of shorter-wavelength side and light of longer-wavelength side, of wavelength band of the green light. Here, as shown in FIG. 3, if wavelength band of the light emitted from rod integrator 102G is called G, color splitting prism 103G splits the light into the shorter-wavelength light (wavelength band G1) and the longer-wavelength light (wavelength band G2), from wavelength band G. That is, the shorter-wavelength light (wavelength band G1) (hereinafter referred to as green light G1) and the longer-wavelength light (wavelength band G2) (hereinafter referred to as green light G2) of wavelength band G are definitely green in color, and the two lights are so called 'of the same color.' In order to separate the light in this manner, it is desirable to design the wavelength selective film formed on color splitting prism 103G to have the property of reflecting light of wavelength band G1 and transmitting light of wavelength band G2, as shown in FIG. 4B.

Figure 4C:
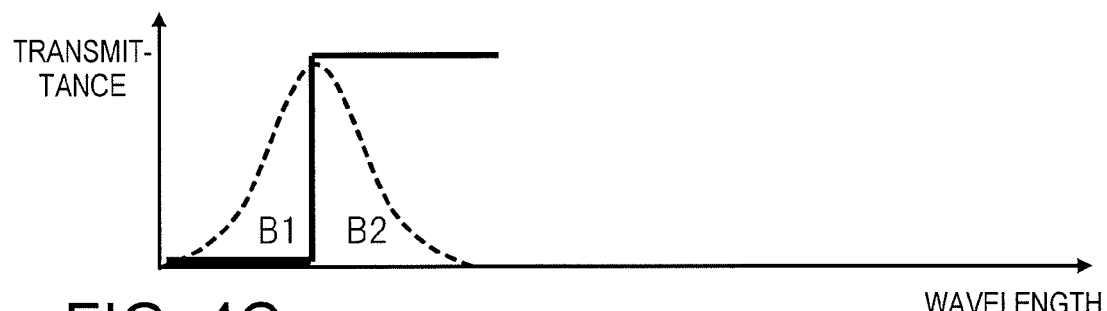
FIG. 4C is a graph showing characteristics of a wavelength selective film formed on light separation prism 103B shown in FIG. 1.

Color splitting prism 103B separates the blue light emitted from rod integrator 102B into light of shorter-wavelength side and light of longer-wavelength side, of wavelength band of the blue light. Here, as shown in FIG. 3, if wavelength band of the light emitted from rod integrator 102B is called B, color splitting prism 103B splits the light into the shorter-wavelength light (wavelength band B1) and the longer-wavelength light (wavelength band B2), from wavelength band B. That is, the shorter-wavelength light (wavelength band B1) (hereinafter referred to as blue light B1) and the longer-wavelength light (wavelength band B2) (hereinafter referred to as blue light B2) of wavelength band B are definitely blue in color, and the two lights are so called 'of the same color.' In order to separate the light in this manner, it is desirable to design the wavelength selective film formed on color splitting prism 103B to have the property of reflecting light of wavelength band B1 and transmitting light of wavelength band B2, as shown in FIG. 4C.

Color splitting prisms 103R, 103G, 103B constitute color splitting unit 130.

Illuminating lens 104R transmits red lights R1, R2, separated by color splitting prism 103R, into light lens 105R. Illuminating lens 105R transmits the red lights R1, R2 into color-composing dichroic mirror 106.

Illuminating lens 104G transmits green lights G1, G2, separated by color splitting prism 103G, into light lens 105G. Illuminating lens 105G transmits the green lights G1, G2 into color-composing dichroic mirror 106.

Illuminating lens 104B transmits blue lights B1, B2, separated by color splitting prism 103B, into light lens 105B. Illuminating lens 105 transmits the blue lights B1, B2 into color-synthesizing dichroic mirror 106.

Color-composing dichroic mirror 106 composes: red lights R1, R2 passed through illuminating lens 105R; green lights G1, G2 passed through illuminating lens 105G; and blue lights B1, B2 passed through illuminating lens 105B, and emits the composed light to illuminating lens 107.

Illuminating lens 107 transmits the light emitted from color-composing dichroic mirror 106 to rotating prism 108.

Rotating prism 108 is placed in the light path between illuminating lens 107 and illuminating lens 109, and is, for example, a prismatic optical part composed of optical glass and optical resin with a square-shaped cross section. In addition, rotating prism 108 is installed with a motor or the like (not shown), and is rotatable. The light passed through illuminating lens 107 is transmitted to rotating prism 108, which is in a rotated state, thereby emitted from different positions on rotating prism 108. Consequently, with regards to a modulating plane on which below-mentioned DMD 111 performs optical modulation, the areas on which the shorter-wavelength light and the longer-wavelength light of each color are shifted.

Illuminating lens 109 transmits the light passed through rotating prism 108 to TIR prism 110.

TIR prism 110 reflects the light, which is passed through illuminating lens 109, to DMD 111. In addition, TIR prism 110 transmits the light (modulated light) emitted from DMD 111 to projection lens 112.

DMD 111 has a large number of micro mirrors which are equivalent to picture elements. DMD 111 is an optical modulating element which performs intensity modulation of incident light by changing the direction of each micro mirror in accordance with display image to emit the light toward TIR prism 110 as modulated light.

Projection lens 112 expands and projects the light passed through TIR prism 110 on screen 150.

Control unit 113 causes, when a stereoscopic image signal representing the left-eye image and the right-eye image is entered, rotation prism 108 to rotate and DMD 111 to perform modulation based on the stereoscopic image signal.

Illuminating lenses 104R, 104G, 104B, 105R, 105G, 105B, 107, 109 are lenses for each of which focal length, shape and material is determined in accordance with predetermined specifications. Although, in FIG. 1, a description is offered with an example of using two illuminating lenses in the optical system for each color light and two illuminating lenses after composition of color lights, the embodiment is not limited the example. The position and the number of the arranged illuminating lenses may be changed appropriately in accordance with specifications of the projector.

Next, operation of projector 100 according to the present embodiment will be described. Hereinafter, the operation in the light path of red light will be described, while the operation in the light paths of green light and blue light is the same as that of red light, and thus, descriptions thereof will be omitted.

Red light exiting from R-colored separate light source 101R is incident on incident plane of rod integrator 102R.

The light incident upon rod integrator 102R is repeatedly subjected to internal reflection in rod integrator 102R, and the intensity distribution thereof is equalized. The incident light is then introduced to color splitting prism 103R.

The light incident upon color splitting prism 103R reaches the plane (plane with dichroic coating) on which the wavelength selective film is formed. As described above, the wavelength selective film formed on the plane with dichroic coating has the property of reflecting light of wavelength band R1 and transmitting light of wavelength band R2. Accordingly, among the lights which have reached the plane with dichroic coating, the light of shorter-wavelength band (red light R1) is reflected toward right-angled prism 203 shown in FIG. 2A, while the light of longer-wavelength band (red light R2) is emitted from face 201b of right-angled prism 201. In addition, red light R1 reflected toward right-angled prism 203 is reflected at face 203c of right-angled prism 303, and is emitted from face 203b of right-angled prism 203.

As described above, the light exiting from R-colored separate light source 101R has its irradiance distribution equalized due to rod integrator 102R. Therefore, the irradiance distribution of each of red light R1 and red light R2, immediately after being emitted from color splitting prism 103R, is also equalized.

In the present embodiment, it is assumed that rod integrator 102R and color splitting prism 103R are designed so that the red light R1, immediately after being emitted from color splitting prism 103R, has a cross sectional form which is rectangular, and almost similar to the cross sectional form of red light R2. In addition, in the present embodiment, it is assumed that rod integrator 102R and color splitting prism 103R are designed so that red light R1 and red light R2, immediately after being emitted from color splitting prism 103R, are close to each other to form a single beam of light, and the cross section of the beam of light is almost similar in form to that of the modulating plane of DMD 111. Further, in the present embodiment, it is assumed that the optical system is designed so that the light exiting from color splitting prism 103R forms an image on the modulating plane of DMD 111 with a predetermined expanding factor.

Consequently, the illumination information formed on the exit plane of color splitting prism 103R is reflected on the modulating plane of DMD 111, on which red light R1 and red light R2 are irradiated without overlapping with one another. The predetermined expanding factor is preferably a value such that the light exiting from color splitting prism 103R forms an image slightly bigger than the modulating surface of DMD 111.

Red light R1 and red light R2 emitted from color splitting prism 103R are incident on rotating prism 108 through illuminating lenses 104R, 105R, color-composing dichroic mirror 106 and illuminating lens 107.

Rotating prism 108 rotates in accordance with the control of controlling unit 113, and due to the rotation of rotating prism 108, with regards to the modulating plane of DMD 111, the irradiated area on which red light R1 and red light R2 are irradiated shifts. The operation by the rotation of rotating prism 108 will be explained hereinafter with reference to FIGS. 5A to 5D.

Each of FIGS. 5A to 5D is a view showing the state that the light (red light R1) exiting from rotating prism 108 forms an image on modulating plane 501 of DMD 111. In FIG. 1, the light emitted from rotating prism 108 passes through illuminating lens 109, gets reflected within TIR prism 110 and is irradiated on DMD 111; however, it is assumed that, in FIGS. 5A to 5D, for the convenience of description, rotating prism 108 and DMD 111 are linearly positioned to each other, and the light exiting from rotating prism 108 is irradiated on the modulating plane of DMD 111 through illuminating lens 109 and illuminating lens 502 (not shown in FIG. 1).

Figure 5A:
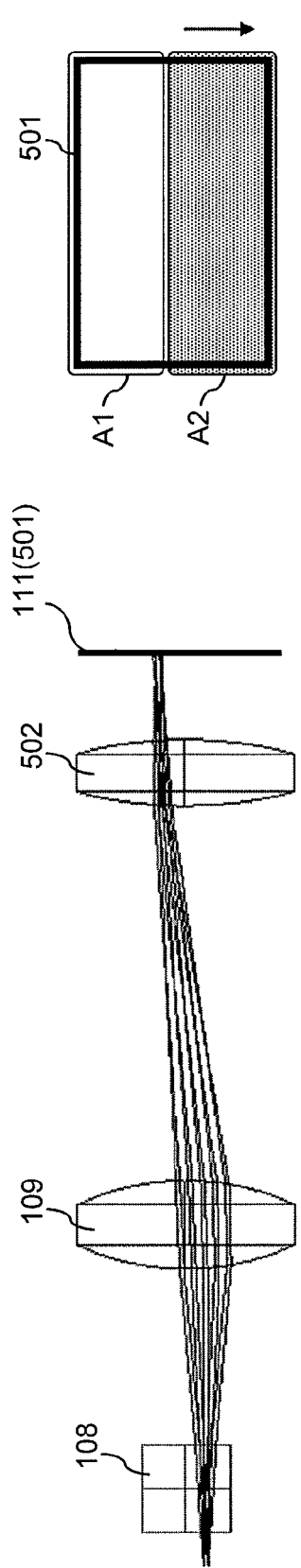
FIG. 5A is a view explaining operation of rotation of the rotating prism shown in FIG. 1.

FIG. 5A is a view showing a state in which an incident plane of light toward rotating prism 108 is almost parallel to the modulating surface 501 of DMD 111.

In a case where the incident plane for the light toward rotating prism 108 is nearly parallel to the modulating surface 501 of DMD 111, rotating prism 108 merely serves as a parallel plate for red light R1 which is irradiated on the bottom portion of incident plane of rotating prism 108. For that reason, red light R1, as shown in FIG. 5A, is irradiated on an area of nearly the top half of modulating plane 501 through illuminating lenses 109, 502. Hereinafter, the area on which red light R1 is irradiated is referred to as area A1.

Also, as mentioned above, red light R1 and red light R2 are irradiated on modulating plane 501 of DMD 111, without overlapping with one another. The images of red light R1 and red light R2 exiting from color splitting prism 103R are formed slightly larger than that of modulating plane 501 such that the images cover the entire modulating plane 501 of DMD 111. Thus, red light R2 is irradiated on an area of nearly the bottom half of modulating plane 501 such that red light R2 does not overlap with area A1. Hereinafter, the area on which red light R2 is irradiated is referred to as area A2.

Figure 5B:
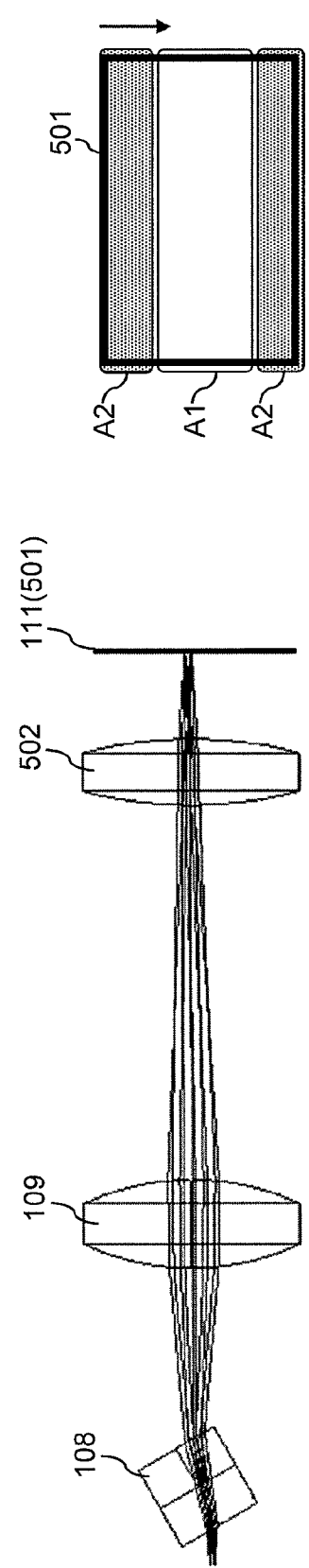
FIG. 5B is a view explaining operation of rotation of the rotating prism shown in FIG. 1.

When rotating prism 108 slightly rotates, as shown in FIG. 5B, from the state shown in FIG. 5A, red light R1 incident on rotating prism 108 gets reflected and is emitted from a different position compared to the case shown in FIG. 5A. Then, the light R1 is irradiated on the bottom area of modulating plane 501. Thus, as shown in FIG. 5B, area A1 shifts even below compared with the case shown in FIG. 5A.

Red light R2 incident on rotating prism 108 is partially irradiated near the lower side of modulating plane 501, and the rest of the light is irradiated near the upper side of modulating plane 501. Thus, as shown in FIG. 5B, area A2 consists of the area near the lower side and the area near upper side of modulating plane 501.

When rotating prism 108 rotates further, as shown in FIG. 5C, from the state shown in FIG. 5B, red light R1 incident on rotating prism 108 is emitted from a different position compared to the case shown in FIG. 5B and irradiated in the area of the bottom half of modulating plane 501. Thus, as shown in FIG. 5C, area A1 is the area of nearly the bottom half of modulating plane 501.

Red light R2 incident on rotating prism 108 is irradiated on the area of the top half of modulating plane 501. Thus, as shown in FIG. 5C, area A2 is the area of nearly the top half of modulating plane 501.

When rotating prism 108 rotates further, as shown in FIG. 5D, from the state shown in FIG. 5C, red light R1 incident on rotating prism 108 is emitted from a different position compared to the case shown in FIG. 5C, and a part of red light R1 is irradiated on the area of near the lower side of modulating plane 501 and the rest is irradiated on the area of near the upper side of modulating plane 501. Thus, area A1, as shown in FIG. 5D, consists of the area near the lower side and the area of upper side of modulating plane 501.

Red light R2 incident on rotating prism 108 gets irradiated even further down on modulating plane 501 compared to the case shown in FIG. 5C. Thus, as shown in FIG. 5D, area A2 is shifted further below compared with the case shown in FIG. 5C.

As illustrated, area A1, upon which red light R1 is incident, shifts in accordance with the rotation of rotating prism 108. Specifically, area A1 scrolls in a direction from top to bottom (in one-dimensional direction).

So, with regard to projector 100 according to the present embodiment, light emitted from R-colored separate light source 101R separates into red light R1 and red light R2 which have almost the same amount of light but are different wavelength bands, and red light R1 and red light R2 are then irradiated on modulating plane 501 of DMD 111. Thus, designing color splitting prism 103R to efficiently perform light separation allows illumination of modulating plane 501 of DMD 111 with little loss of light, and thus, with high use efficiency of light.

Control unit 113 rotates rotating prism 108 when stereoscopic image signal representing the left-eye image and the right-eye image are entered. As described, area A1, upon which red light R1 is irradiated, and area A2, upon which red light R2 is irradiated, shift in accordance with the rotation of rotating prism 108. Thus, directing attention toward a certain location on the modulating plane of DMD 111, red light R1 and red light R2 are irradiated alternately on this location.

Control unit 113 controls driving of DMD 111 in accordance with the shift of area A1 upon which red light R1 is irradiated, and the shift of area A2 upon which red light R2 is irradiated. Specifically, control unit 113, with regard to area A1, of the left-eye image represented in the stereoscopic image signal, performs modulation in accordance with the image signal of the image corresponding to the location of area A1 in modulating plane 501 of DMD 111, and with regard to area A2, of the right-eye image represented in the stereoscopic signal, performs modulation in accordance with the image signal of the image corresponding to the location of area A2 in modulating plane 501 of DMD 111.

Although the current explanation is made about red light, control unit 113 causes DMD 111 to perform modulation for green light and blue light in the same way as red light. This makes it possible to display the left-eye image and the right-eye image on screen 150.

With the left-eye image and the right-eye image projected on screen 150 by means of lights with different wavelength bands, the viewer is allowed to observe a display image on screen 150 through a pair of glasses with the left-eye lens transmitting the shorter-wavelength lights (red light R1, green light G1 and blue light B1) and reflecting the longer-wavelength lights (red light R2, green light G2 and blue light B2) and the right-eye lens transmitting the longer-wavelength lights (red light R2, green light G2 and blue light B2) and reflecting the shorter-wavelength lights (red light R1, green light G1 and blue light B1). This will allow the left-eye of the viewer to see the left-eye image and the right-eye of the viewer to see the right-eye image, thus making the viewer perceive the image stereoscopically.

Thus, projector 100 according to the present embodiment is equipped with: color splitting prism 103 which separates light emitted from a light source into lights with different wavelength bands; TIR prism 110 through which two lights separated by the color splitting prism 103 pass; DMD 111 upon which the two lights emitted from TIR prism 110 are incident and which then modulates the two lights and emits them toward TIR prism 110; projection lens 112 which expands and projects the two lights which are modulated by DMD 111 and passed through TIR prism 111; and rotating prism 108 which is rotatably arranged in the light path between color splitting prism 103 and TIR prism 110 and emits, from different positions in accordance with the rotation, the two lights emitted from color splitting prism 103. Also, once the stereoscopic image signals representing the left-eye image and right-eye image are entered, projector 100 according to the present embodiment allows DMD 111 to perform modulation according to the image signal of the left-eye image for the area in which one of the two lights separated by the color splitting prism 103 is irradiated, and perform modulation according to the image signal of the right-eye image for the area in which the other light of the two light separated by the color splitting prism 103 is irradiated.

Thus, it is possible to project the left-eye image and the right-eye image by lights with different wavelength bands, and to allow the viewer to stereoscopically perceive the image. In addition, color splitting prism 103 and rotating prism 108 are generally more affordable than optical elements such as a reflective polarizing plate, a polarizing beam splitter, a polarized switching element. Also, since a polarizing beam splitter does not have to be installed between an optical modulation element and a projection lens, the back focus of the projection lens does not need to be long, and the enlargement of projection lens and the enlargement of entire optics are not necessary. Therefore, it is possible to display a stereoscopic image with a simple device configuration while preventing cost from increasing.

Figure 6:
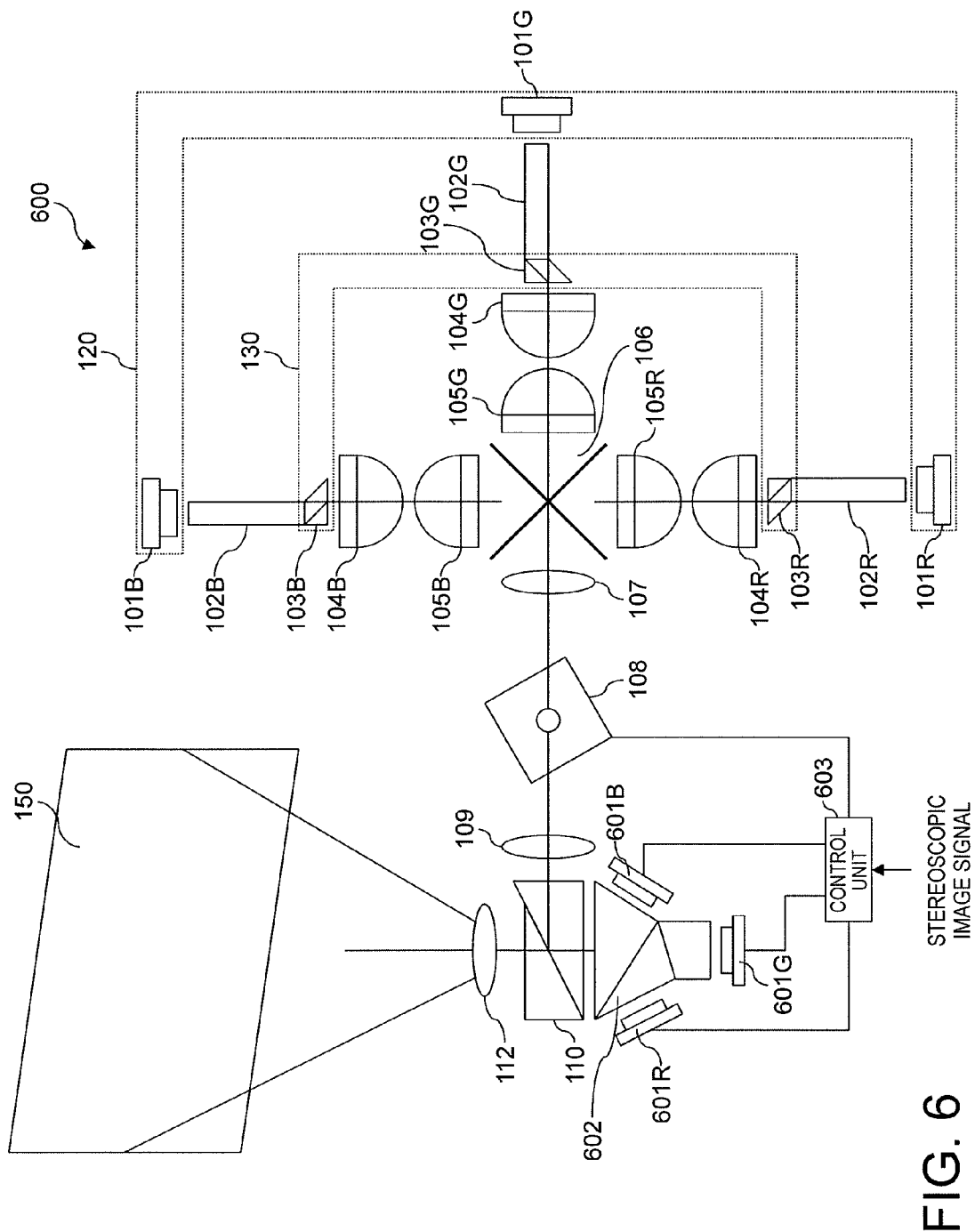
FIG. 6 is a schematic constitution diagram of a projector according to the second embodiment of the present invention.

Second Embodiment:

FIG. 6 is a view showing the schematic constitution of projector according to the second embodiment of the present invention. With regard to FIG. 6, the constitution elements similar to those shown in FIG. 1 will be given the same reference signs, and descriptions thereof will be omitted.

Projector 600 according to the present embodiment is different from projector 100 of the first embodiment in that DMD 111 is removed and DMDs 601R, 601G, 601B are installed, color separation prism 602 is installed, and control unit 113 is replaced with control unit 603.

DMDs 601R, 601G, 601B are DMDs provided for red light, green light and blue light, respectively. Also, the constitution of each of DMD 601R, 601G, 601B is the same as that of DMD 111, thus descriptions thereof will be omitted.

As described, red light emitted from R-colored separate light source 101R, green light emitted from the G-colored separate light source 101G of and blue light emitted from the B-colored separate light source 101B of are composed by color-composing dichroic mirror 106. The light composed by color-composing dichroic mirror 106 is then incident upon color separation prism 602 through illuminating lens 107, rotating lens 108, illuminating lens 109 and TIR prism 110.

Color separation prism 602 separates the incident light into red light, green light and blue light, and emits the red light (red light R1 and red light R2) to DMD 601R, the green light (green light G1 and green light G2) to DMD 601G, and the blue light (blue light B1 and blue light B2) to DMD 601B.

Once the stereoscopic image signal is entered, control unit 603 rotates rotating prism 108. With the rotation of rotating prism 108, as in the first embodiment, the area in which the shorter-wavelength light of each color is irradiated and the area in which the longer-wavelength light of each color is irradiated are shifted in the modulating plane of each of DMDs 601R, 601G, 601B.

Moreover, control unit 603 allows DMD 601R to modulate the red light (red light R1 and red light R2) incident from color separation prism 602 according to the red color component in the stereoscopic image signal, allows DMD 601G to modulate the green light (green light G1 and green light G2) incident from color separation prism 602 according to the green color component in the stereoscopic image signal, and allows DMD 601B to modulate the blue light (blue light B1 and blue light B2) incident from the color separation prism according to the blue color component in the stereoscopic image signal. In addition, as in control unit 113 of the first embodiment, control unit 603 allows each DMD to modulate the shorter-wavelength light according to the image signal for the image corresponding to the location of the area within the modulating plane in which the short-wavelength light are irradiated, among the left-eye image represented by the stereoscopic image signal, and to modulate the longer-wavelength light according to the image signal for the image corresponding to the location of the area within the modulating plane in which the longer-wavelength light are irradiated, among the right-eye image represented by the stereoscopic image signal.

With regard to the aforementioned first and second embodiments, described are the examples in which the shorter-wavelength lights (red light R1, green light G1 and blue light B1) are modulated according to the image signal of the left-eye image and the longer-wavelength lights (red light R2, green light G2 and blue light B2) are modulated according to the image signal of the right-eye image. However, the embodiments are not particularly restricted to these examples. The longer-wavelength lights (red light R2, green light G2 and blue light B2) may be modulated according to the image signal of the left-eye image, and the shorter-wavelength lights (red light R1, green light G1 and blue light B1) may be modulated according to the image signal of the right-eye image.

Figure 7A:
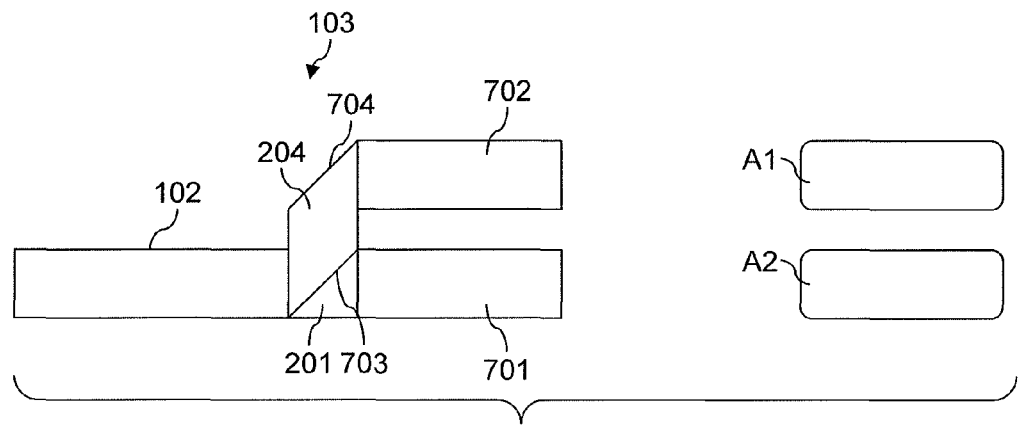
FIG. 7A is a top view illustrating another example of configuration of the color splitting prism shown in FIG. 1 or FIG. 6.
Figure 7B:
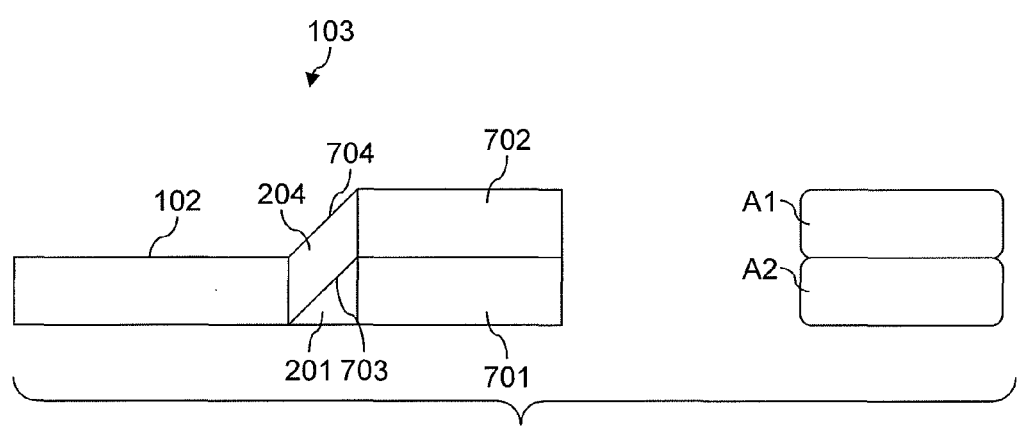
FIG. 7B is a top view illustrating a further example of configuration of the color splitting prism shown in FIG. 1 or FIG. 6.

Also, with regard to the first and second embodiments, describes are the example in which the light emitted from rod integrator 102 is separated into the shorter-wavelength light and the longer-wavelength light using color splitting prism 103 and then the separated lights are irradiated on the modulating plane of DMD 111. However, the embodiments are not particularly restricted these examples. For example, as shown in FIGS. 7A and 7B, a rod integrator may be arranged on the light exit plane of color splitting prism 103. With regard to FIGS. 7A and 7B, it is assumed that color splitting prism 103 has constitution including rectangular prism 201 and parallelogram prism 204, shown in FIG. 2B.

With regard to FIG. 7A, two rod integrators 701, 702 are jointed with color splitting prism 103. Here, rod integrators 701, 702 are arranged in the light exiting position of color splitting prism 103. Specifically, rod integrator 701 is placed so that the light transmitted through jointing face 703 of rectangular prism 201 and prism 204 is incident on rod integrator 701. Moreover, rod integrator 702 is placed so that the light reflected from opposite face 704 of jointing face 703 of rectangular prism 201 and prism 204 is incident on rod integrator 702.

Each of rod integrators 701, 702 emits light after equalizing the irradiance distribution of the incident light. The wavelength selective film formed in jointing face 703 of the rectangular prism 201 and prism 204 in order to separate the light incident on light separation prism 103 into light of shorter-wavelength side and light of longer-wavelength side might have ununiformed properties due to factors such as manufacturing error. If the properties of the wavelength selective film become ununiformed, the shorter-wavelength light and the longer-wavelength light separated by light separation prism 103 might have luminance ununiformity and irradiance ununiformity. Here, it is possible to generate the lights in which luminance uniformity and irradiance uniformity is reduced by making the shorter-wavelength light and the longer-wavelength light, which are separated by light separation prism 103, incident on rod integrators.

The light emitted from rod integrators 701, 702 are irradiated on DMD 111 through illuminating lens 104 and TIR prism 110. Here, with regard to FIG. 7A, rod integrator 701 and rod integrator 702 are arranged with an interval. Thus, as shown in FIG. 7A, with regard to the modulating plane of the DMD, area A1 upon which the shorter-wavelength lights are irradiated and area A2 upon which the longer-wavelength lights are irradiated are separated from each other.

As shown in FIG. 7B, placing rod integrator 701 and rod integrator 702 closely together also brings close together the area A1 upon which the shorter-wavelength lights are irradiated and the area A2 upon which the longer-wavelength lights are irradiated. In this case, it is preferable that a reflection mirror is formed at the boundary face between rod integrator 701 and rod integrator 702. Forming the reflection mirror at the boundary face between rod integrator 701 and rod integrator 702 allows for emitting of light with highly uniform irradiance distribution from each rod integrator.

With regard to first and second embodiments, described are the examples in which color light emitted from separate light source 101 is separated into the shorter-wavelength light and the longer-wavelength light using color splitting prism 103. However the embodiments are not particularly restricted to the examples. For example, rod integrator 102 may have the function of separating light.

Figure 8:
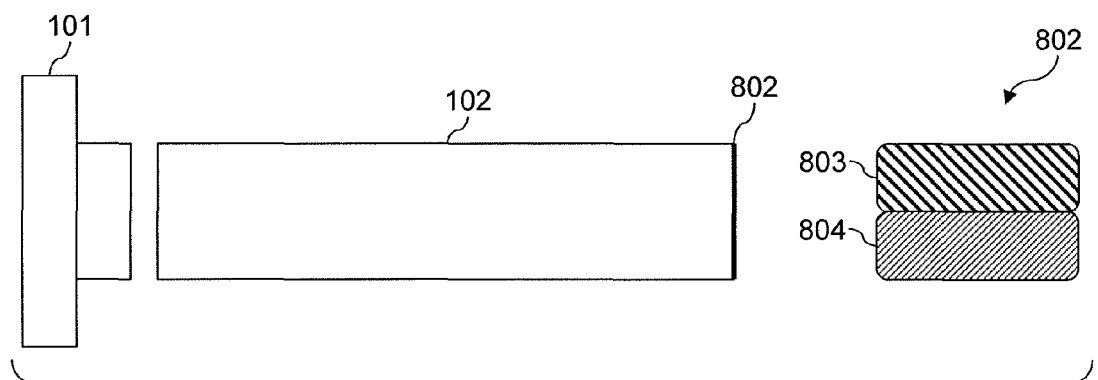
FIG. 8 is a view illustrating a variation of configuration of the rod integrator shown in FIG. 1 or FIG. 6.

FIG. 8 shows the constitution of rod integrator 102 when rod integrator 102 has the function of separating light projected from separate light source 101 into short-wavelength light and long-wavelength light.

The light incident on rod integrator 102 from separate light source 101 reaches exit plane 801 of rod integrator 102 with repeating reflection inside rod integrator 102. Here, on exit plane 801 of rod integrator 102, as shown in FIG. 8, dichroic mirror coatings 802, 803 of different properties are applied to the upper half and lower half of exit plane 801.

Dichroic mirror coating 802 has the property of transmitting light of shorter-wavelength side and reflecting light of longer-wavelength side among the light emitted from separate light source 101. Also, dichroic mirror coating 803 has the property of transmitting the longer-wavelength light and reflecting the shorter-wavelength light among the light emitted from separate light source 101.

Therefore, with regard to exit plane 801 of rod integrator 102, the area with dichroic mirror coating 802 emits the shorter-wavelength light, and the area with dichroic mirror coating 803 emits the longer-wavelength light. Thus, exit plane 801 of rod integrator 102 separately emits lights with nearly the same illumination and different wavelength bands (i.e., the shorter-wavelength light and the longer-wavelength light).

In addition, dichroic mirror coating 802 reflects the longer-wavelength light and dichroic mirror coating 803 reflects the shorter-wavelength light. These lights transmit inside rod integrator 102 toward object light source 101, are reflected on the surface of separate light source 101, and, again, transmit toward exit plane 801 of rod integrator 102. Therefore, even when dichroic mirror coatings 802, 803 are applied to exit plane 801 of rod integrator 102, reduction in the use efficiency of light is suppressed.

In addition, as light source 101, a light source device may be used which irradiates laser light to a phosphor and emits fluorescent light emitted from the phosphor excited by irradiance of the laser light, and which has the function of separating light. Such a light source device is shown in FIG. 9.

Figure 9:
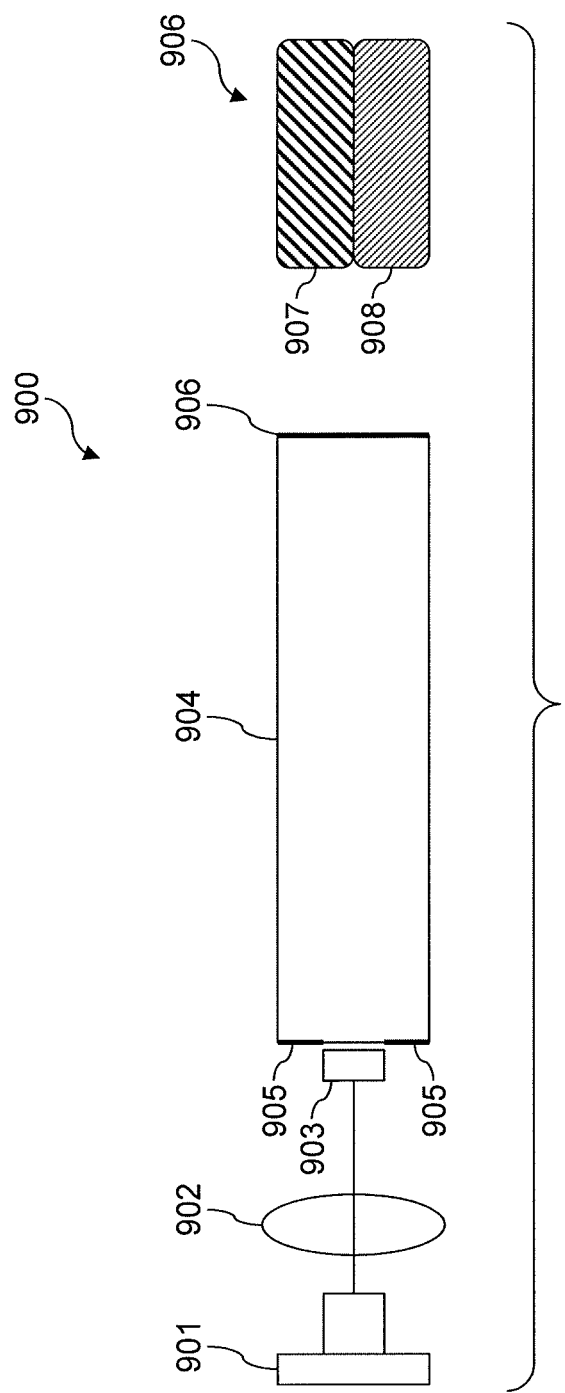
FIG. 9 is a view illustrating a variation of the light source unit shown in FIG. 1 or FIG. 6.

The light source device shown in FIG. 9 includes: excitation light source 901, lens 902, phosphor 903 and rod integrator 904.

Excitation light source 901 emits excitation light that excites phosphor 903.

Lens 902 concentrates the light emitted from excitation light source 901 in phosphor 903.

Phosphor 903 is fixed on the incident plane of rod integrator 904. Phosphor 903 is excited by the irradiance of the excitation light concentrated by lens 902 and emits the fluorescent light on the incident plane of rod integrator 904.

Rod integrator 904, by reflecting within itself the fluorescent light projected from phosphor 903 on the incident plane, equalizes the irradiance distribution, converts the light into one with rectangular-shaped cross section and emits the converted light from exit plane. Here, in the incident plane of rod integrator 904, reflection mirror 905 is formed in the part where phosphor 903 is not fixed. In addition, on exit plane 906 of rod integrator 904, as shown in FIG. 9, dichroic mirror coatings 907, 908 with different properties are applied to the upper half and lower half of exit plane 906.

Dichroic mirror coating 907 has the property of transmitting light of shorter-wavelength side and reflecting light of longer-wavelength side, among the fluorescent light emitted from phosphor 903. In addition, dichroic mirror coating 908 has the property of transmitting the longer-wavelength light and reflecting the shorter-wavelength light, among the fluorescent light emitted from phosphor 903.

Thus, in exit plane 906 of rod integrator 904, the area with dichroic mirror coating 907 emits the shorter-wavelength light, and the area with dichroic mirror coating 908 emits the longer-wavelength light. So, exit plane 905 of rod integrator 904 separately emits lights with nearly the same illumination and different wavelength bands (i.e., the shorter-wavelength light and the longer-wavelength light).

In addition, dichroic mirror coating 907 reflects the longer-wavelength light and dichroic mirror coating 908 reflects the shorter-wavelength light. These lights transmit inside rod integrator 904 toward phosphor 903, are reflected in reflection mirror 905 formed on the incident plane of rod integrator 904, and, again, transmit toward exit plane 906 of rod integrator 904. Therefore, even when dichroic mirror coatings 907, 908 applied to exit plane 906 of rod integrator 904, reduction in the use efficiency of light is suppressed.

The present invention has been described above with the embodiments, but the present invention is not restricted to the above embodiments. Various modification which those skilled in the art can realize may be made on the constituents and details of the present invention within the scope of the present invention.

All or a portion of the above-described embodiments may be described in the following supplementary notes, but are not restricted to the following supplementary notes.

[Supplementary Note 1]

A projector comprising:

at least one light source;

a light separation unit which separates light emitted from the light source into first light and second light in different wavelength bands;

a TIR prism through which the first light and the second light pass;

an optical modulating element which is irradiated with and modulates the first light and the second light emitted from the TIR prism and then emits the modulated first light and the modulated second light toward the TIR prism;

a projection lens expanding and projecting light which is modulated by the optical modulating element and passes through the TIR prism;

a rotating prism which is rotatably arranged in a light path between the light separation unit and the TIR prism and emits, from different positions in accordance with rotation, the first light and the second light emitted from the light separation unit; and a control unit causing, when image signals representing a first image and a second image are supplied, the optical modulating element to perform modulation according to the image signal of the first image with regard to an area upon which the first light is irradiated and to performs modulation according to the image signal of the second image with regard to an area upon which the second light is irradiated.

[Supplementary Note 2]

The projector according to supplementary note 1, wherein the first light and the second light are in the same color.

[Supplementary Note 3]

The projector according to supplementary note 1 or 2, further comprising:

a rod integrator on which colored light emitted from the light source is incident and which equalizes irradiance distribution of the incident light to emit the equalized light toward the light separation unit.

[Supplementary Note 4]

The projector according to any one of supplementary notes 1 to 3, further comprising:

a first rod integrator on which the first light is incident and which equalizes irradiance distribution of the first light to emit the equalized first light to the rotating prism; and a second rod integrator on which the second light is incident and which equalizes irradiance distribution of the second light to emit the equalized second light to the rotating prism.

[Supplementary Note 5]

The projector according to supplementary note 4, wherein the first rod integrator and the second integrator are adjacently installed, and a reflection mirror is formed in a boundary face of the first rod integrator and the second rod integrator.

[Supplementary Note 6]

The projector according to any one of supplementary notes 1 to 5, wherein the first light and the second light are close to each other to form a single beam of light.

[Supplementary Note 7]

The projector according to supplementary note 6, wherein a cross-sectional shape of the beam of light and a cross-sectional shape of the modulating plane are similar in form.

[Supplementary Note 8]

The projector according to any one of supplementary notes 1 to 6, wherein the light source comprises:
a first light source emitting red light;
a second light source emitting green light; and
a third light source emitting blue light, and
the light separation unit comprises:
a red light separation unit separating the red light emitted from the first light source into first red light and second red light in different wavelength bands;
a green light separation unit separating the green light emitted from the second light source into first green light and second green light in different wavelength bands; and
a blue light separation unit separating the blue light emitted from the third light source into first blue light and second blue light in different wavelength bands.

[Supplementary Note 9]

The projector according to supplementary note 8, wherein the optical modulating element is correspondingly provided for each of the red light, green light and blue light, and the projector further comprises:
a color separation prism which irradiates the first red light and the second red light, separated by the red light separation unit, toward the optical modulating element correspondingly provided for the red light, irradiates the first green light and the second green light separated by the green light separation unit toward the optical modulating element correspondingly provided for the green light, and irradiates the first blue light and the second blue light separated by the blue light separation unit toward the optical modulating element correspondingly provided for the blue light.

[Supplementary Note 10]

A control method of a projector, the method comprising:
inputting an image signal of a first image and an image signal of a second image to the projector;
causing a light source to emit light to be incident on a light separation unit thereby separating the light into a first light and a second light in different wavelength bands by the light separation unit;
introducing the first light and the second light into a rotating prism rotatably arranged in a light path between the light separation unit and an optical modulating element;
causing the rotating prism to emit the first light and the second light from different positions in accordance with rotation thereof to irradiate the first light and the second light, which are emitted from the rotating prism, to the optical modulating element; and
causing the optical modulating element to perform modulation according to the image signal of the first image with regard to an area upon which the first light is irradiated and to perform modulation according to the image signal of the second image with regard to an area upon which the second light is irradiated.

The invention claimed is:

1. A projector comprising:
at least one light source;
a light separation unit which separates light emitted from the light source into a first light and a second light in different wavelength bands;
a TIR prism through which the first light and the second light pass;
an optical modulating element which is irradiated with and modulates the first light and the second light emitted from the TIR prism and then emits the modulated first light and the modulated second light toward the TIR prism;
a projection lens expanding and projecting light which is modulated by the optical modulating element and passes through the TIR prism;
a rotating prism which is rotatably arranged in a light path between the light separation unit and the TIR prism and emits, from different positions in accordance with rotation, the first light and the second light emitted from the light separation unit; and
a control unit causing, when image signals representing a first image and a second image are supplied, the optical modulating element to perform modulation according to the image signal of the first image with regard to an area upon which the first light is irradiated and to perform modulation according to the image signal of the second image with regard to an area upon which the second light is irradiated,
wherein the first light and the second light are in the same color.

2. The projector according to claim 1, further comprising:
a rod integrator on which colored light emitted from the light source is incident and which equalizes irradiance distribution of the incident light to emit the equalized light toward the light separation unit.

3. The projector according to claim 1, further comprising:
a first rod integrator on which the first light is incident and which equalizes an irradiance distribution of the first light to emit the equalized first light to the rotating prism; and
a second rod integrator on which the second light is incident and which equalizes irradiance distribution of the second light to emit the equalized second light to the rotating prism.

4. The projector according to claim 3, wherein the first rod integrator and the second rod integrator are adjacently arranged, and
a reflection mirror is formed in a boundary face of the first rod integrator and the second rod integrator.

5. The projector according to claim 1, wherein the first light and the second light are close to each other to form a single beam of light.

6. The projector according to claim 5, wherein a cross-sectional shape of the beam of light and a cross-sectional shape of the modulating plane are similar in form.

7. The projector according to claim 1, wherein
the light source comprises:
a first light source emitting red light;
a second light source emitting green light; and
a third light source emitting blue light, and
the light separation unit comprises:
a red light separation unit separating the red light emitted from the first light source into first red light and second red light in different wavelength bands;
a green light separation unit separating the green light emitted from the second light source into first green light and second green light in different wavelength bands; and a blue light separation unit separating the blue light emitted from the third light source into first blue light and second blue light in different wavelength bands.

8. The projector according to claim 7, wherein
the optical modulating element is correspondingly provided for each of the red light, green light and blue light, and
the projector further comprises:
a color separation prism which irradiates the first red light and the second red light separated by the red light separation unit toward the optical modulating element correspondingly provided for the red light, irradiates the first green light and the second green light separated by the green light separation unit toward the optical modulating element correspondingly provided for the green light, and irradiates the first blue light and the second blue light separated by the blue light separation unit toward the optical modulating element correspondingly provided for to the blue light.

9. The projector according to claim 2, further comprising:
a first rod integrator on which the first light is incident and which equalizes an irradiance distribution of the first light to emit the equalized first light to the rotating prism; and
a second rod integrator on which the second light is incident and which equalizes irradiance distribution of the second light to emit the equalized second light to the rotating prism.

10. The projector according to claim 9, wherein the first rod integrator and the second integrator are adjacently arranged, and
a reflection mirror is foamed in a boundary face of the first rod integrator and the second rod integrator.

11. The projector according to claim 2, wherein the first light and the second light are close to each other to form a single beam of light.

12. The projector according to claim 2, wherein
the light source comprises:
a first light source emitting red light;
a second light source emitting green light; and
a third light source emitting blue light, and
the light separation unit comprises:
a red light separation unit separating the red light emitted from the first light source into first red light and second red light in different wavelength bands;
a green light separation unit separating the green light emitted from the second light source into first green light and second green light in different wavelength bands; and
a blue light separation unit separating the blue light emitted from the third light source into first blue light and second blue light in different wavelength bands.

13. The projector according to claim 12, wherein
the optical modulating element is correspondingly provided for each of the red light, green light and blue light, and
the projector further comprises:
a color separation prism which irradiates the first red light and the second red light separated by the red light separation unit toward the optical modulating element correspondingly provided for the red light, irradiates the first green light and the second green light separated by the green light separation unit toward the optical modulating element correspondingly provided for the green light, and irradiates the first blue light and the second blue light separated by the blue light separation unit toward the optical modulating element correspondingly provided for to the blue light.

14. The projector according to claim 3, wherein the first light and the second light are close to each other to form a single beam of light.

15. The projector according to claim 3, wherein
the light source comprises:
a first light source emitting red light;
a second light source emitting green light; and
a third light source emitting blue light, and
the light separation unit comprises:
a red light separation unit separating the red light emitted from the first light source into first red light and second red light in different wavelength bands;
a green light separation unit separating the green light emitted from the second light source into first green light and second green light in different wavelength bands; and
a blue light separation unit separating the blue light emitted from the third light source into first blue light and second blue light in different wavelength bands.

16. The projector according to claim 15, wherein
the optical modulating element is correspondingly provided for each of the red light, green light and blue light, and
the projector further comprises:
a color separation prism which irradiates the first red light and the second red light separated by the red light separation unit toward the optical modulating element correspondingly provided for the red light, irradiates the first green light and the second green light separated by the green light separation unit toward the optical modulating element correspondingly provided for the green light, and irradiates the first blue light and the second blue light separated by the blue light separation unit toward the optical modulating element correspondingly provided for to the blue light.

17. A control method of a projector, the method comprising:
inputting an image signal of a first image and an image signal of a second image to the projector;
causing a light source to emit light to be incident on a light separation unit thereby separating the light into a first light and a second light in different wavelength bands by the light separation unit;
introducing the first light and the second light into a rotating prism rotatably arranged in a light path between the light separation unit and an optical modulating element;
causing the rotating prism to emit the first light and the second light from different positions in accordance with rotation thereof to irradiate the first light and the second light, which are emitted from the rotating prism, to the optical modulating element; and
causing the optical modulating element to perform modulation according to the image signal of the first image with regard to an area upon which the first light is irradiated and to perform modulation according to the image signal of the second image with regard to an area upon which the second light is irradiated,
wherein the first light and the second light are in the same color.

* * * * *